L. G. HANDY.
WHEEL.
APPLICATION FILED JUNE 4, 1910.
1,013,995.
Patented Jan. 9, 1912.
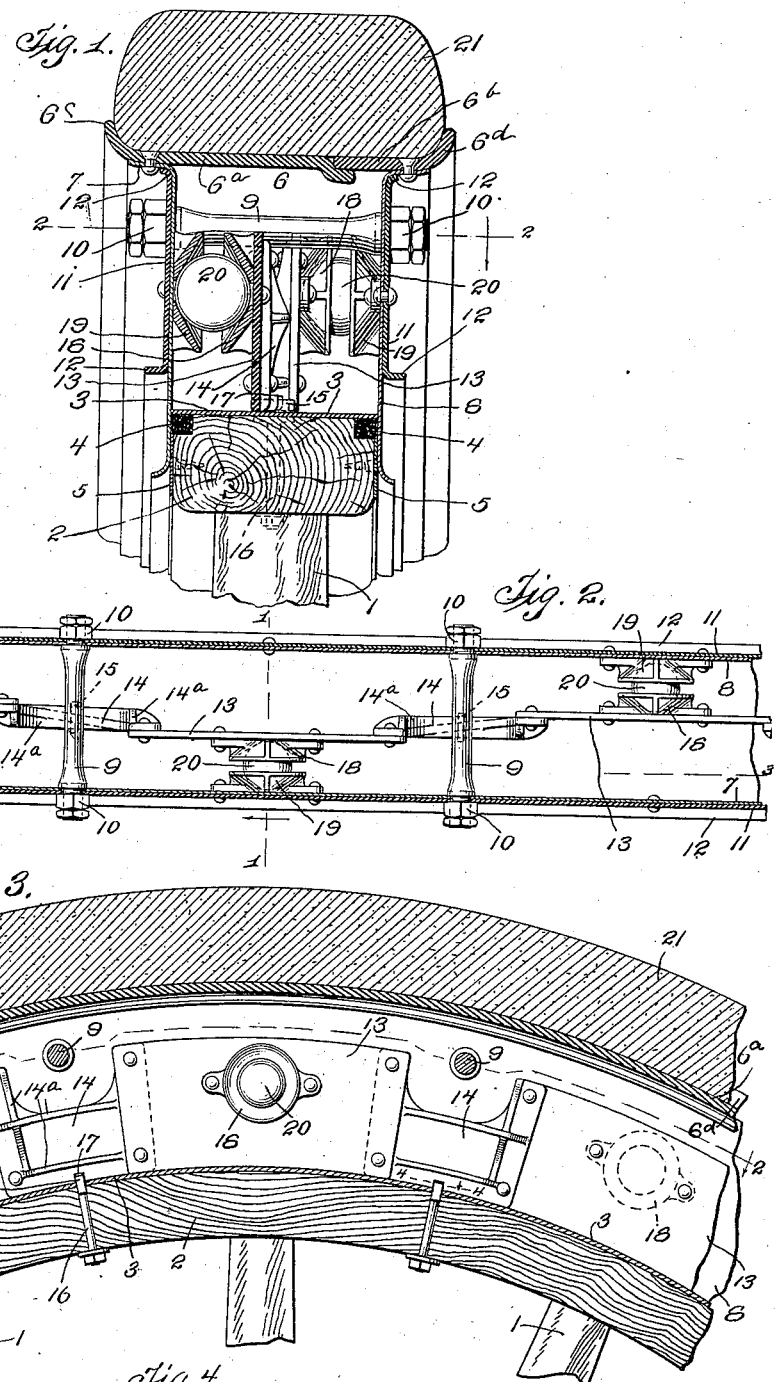
Witnesses:
J. A. Kolle
Edgar M. Kitchin
Inventor
L. G. Handy
By his Attorney
F. H. Gibbs

UNITED STATES PATENT OFFICE.

LEVIN GESSFORD HANDY, OF RUTHERFORD, NEW JERSEY, ASSIGNOR TO WILLIAM C. DICKERMAN, OF NEW YORK, N. Y.

WHEEL.

1,013,995.   Specification of Letters Patent.   Patented Jan. 9, 1912.

Application filed June 4, 1910. Serial No. 565,064.

*To all whom it may concern:*

Be it known that I, LEVIN GESSFORD HANDY, residing at Rutherford, New Jersey, and being a citizen of the United States, have invented new and useful Improvements in Wheels, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a vertical, transverse, section taken through a wheel embodying the features of the present invention, the section being taken approximately on the plane indicated by line 1—1 of Fig. 2, and looking in the direction indicated by the arrow, only a fragment of the wheel being seen. Fig. 2 is a circumferential section taken on the plane indicated by line 2—2 of Fig. 3, parts being seen in extension. Fig. 3 is a vertical section taken on the plane indicated by line 3—3 of Fig. 2. Fig. 4 is a detail section taken on the plane indicated by line 4—4 of Fig. 3.

The object of the present invention is the provision of means for providing peripheral elasticity and resiliency equal to and without the employment of a pneumatic tire by the combination of spring and friction elements without sacrificing firmness and solidity in the action of the parts of the wheel.

Further objects will hereinafter become apparent in part and in part be stated.

Referring to the drawings by numerals, 1 indicates the spokes, 2 the felly, and 3 the fixed rim of a wheel body which may be of any ordinary type which elements with the hub, not illustrated, constitute the wheel body. The outer circumferential corners of felly 2 are rabbeted, as at 4, and filled with suitable packing which may be provided with a lubricant if desired. Each of the side faces of the felly 2 is provided with an annulus or wearing plate 5.

Surrounding the wheel body and spaced from fixed rim 3 is a detachable rim 6 comprising an annular band $6^a$, and a ring $6^b$ detachably connected thereto, the band having an annular tire retaining flange $6^c$ at its outer edge, and the ring having a similar flange $6^d$ at its outer edge. An annular channel guide plate 7 has its outer flange fixed to the band $6^a$, and a similar plate 8 has its outer flange fixed to the ring $6^b$, said guide plates extending inwardly past the rim 3 and into sliding engagement with the plates 5, said guiding plates 7 and 8 being spaced apart a distance equal to the width of the felly 2. Band $6^a$ and ring $6^b$ may have their inner edges meeting in any preferred manner as by an offset in one receiving the edge of the other, and the parts are rigidly secured together by bolts 9—9, arranged at intervals about the wheel and connecting the plates 7 and 8. Each bolt 9 is formed with an annular shoulder near each end resting against the respective plates 7 or 8, and with a reduced threaded end portion extending through the respective plates and engaged by retaining nut 10 which may be locked in position by a suitable lock nut. Each guide plate 7 and 8 is stiffened by an exteriorly arranged annular plate 11, having marginal flanges 12—12 for strengthening and stiffening purposes, each of said plates preferably extending past, and being penetrated by the threaded reduced portions of the bolts 9. Said bolts thus form spacing and connecting means for the guide and stiffening plates, and the stiffening plates may have other means of connection with the guide plates as by being riveted thereto at suitable points.

Surrounding the wheel body and inclosed by the guide plates 7 and 8 and rim 6, is a circumferential spring annulus comprising the alternate spring plate segments 13 and connectors 14 therefor, each connector comprising a casting or other relatively stiff member. Each spring plate segment 13 has its faces disposed parallel to the faces of the guide plates, and the plate 13 is thus disposed edgewise with respect to the rims 3 and 6, and each of said plates 13 is spaced laterally from the circumferential median line of the wheel body, one on one side thereof, and the other on the other side, so as to be staggered about the wheel, and each connector 14 comprises a diagonally disposed web having one end connected to one end of one spring plate segment 13 at one face of the connector, and the other end connected to the relatively opposite end of the next contiguous spring plate segment on the opposite face of the connector. The web of the connector may be strengthened by laterally projecting flanges 14ª in any suitable arrangement.

Each connector 13 has its upper edge formed with a notch or opening accommodating the respective bolt 9 for permitting lateral movement of the bolt with the longitudinal, circumferential shifting of the demountable rim. The inner edge of each spring plate segment 13 and each connector 14, rests against the outer surface of rim 3, and the flattened heads 15 of bolts 16 extend outwardly from the rim into notches 17 in the inner edge of connectors 14, there being one notch in each connector disposed midway of the length thereof. Each bolt 16 extends radially inwardly through the felly and is engaged at its inner end by a suitable retaining nut. Each notch 17, as best seen in Fig. 4, is formed with rounded edges for allowing twisting movement or rocking of the respective connector 14 on the minor axis thereof.

An outwardly opening cup 18 is fixed to each plate 13, one at one side of one plate, and the next at the opposite side of the next plate, and fixed to the guide plates 7 and 8 are corresponding inwardly opening cups 19, disposed respectively opposite the cups 18 and forming pairs therewith. A ball 20 is disposed within and between the cups of each pair.

In operation, the thrust of the wheel body under the stress of the load carried thereby, will be taken up first by the spring annulus, producing uniform shifting of the cups 18 which is resisted by the resulting movement of the balls 20 riding out the inclined sides of the cups, and thus effecting separation of the cups, thus bowing spring plate segments 13 laterally, one in one direction and the next in the opposite direction entirely around the wheel. Such bowing of plates 13 moves the same inwardly, that is toward the circumferential median line of the wheel body, at the same time swinging each connector 14 on its minor axis. It will be noted that the space between planes extending transversely of the connectors through the points of engagement of each connector 14 with the respective spring plate segment 13, owing to the diagonal positioning of said connector, is shortest while the connector is diagonally positioned and increases as the connector swings pivotally on its minor axis toward a position parallel to the guide plates 7 and 8; that is as the connector moves toward a position bringing the several staggered plates 13 more nearly into circumferential alinement, and thus the ends of each individual plate 13 are farthest apart when the respective plate 13 is farthest from the circumferential median line of the wheel body, and the ends of each plate 13 approach each other as the respective plate 13 moves laterally toward such median line. Hence longitudinally and circumferential contraction of the spring plates occasioned by the bowing thereof, will be compensated without appreciable variation in the diameter of the spring annulus. The spring annulus may thus at all times snugly fit the wheel body, that is have its inner edge in contact with the outer surface of the rim 3. As soon as the pressure is released from the wheel body, the spring action of segments 13 forcing the segments back into a normal, straight condition, returns the balls to their former central position in the cups. Obviously, considering the operation from the opposite point of action, the thrust will be taken first by the rim 6 and transmitted thence through the guide plates and balls, which latter, riding out the inclined walls of the cups, spread the cups apart and bow or bend laterally the spring segments 13 and resist independent movement of the rim. The spring action on the rim is thus damped by the ball friction. Ordinarily, aside from the results of vibrations of the rim due to shocks and jars from unevenness of the roadway, the rim, while the wheel is under load, will remain slightly eccentric to the wheel body, and the balls 20 will travel in orbits about the cups with the travel of the cups as the wheel revolves.

It is obvious of course that the heads 15 of bolts 16 in their engagement with notches 17 of connectors 14 afford operative connection between the several spring plate sections 13 and the wheel body, and if desired, other forms of connection may be provided.

What I claim is:

1. In a wheel, a wheel body, a rim therefor, and a spring annulus surrounding the wheel body and engaging the same and comprising spaced plate spring sections disposed endwise with respect to each other and edgewise with respect to the wheel body and rim, and connectors rigidly connecting adjacent ends of the sections, and means of engagement between the annulus and the rim.

2. In a wheel, a wheel body, a rim therefor, an annulus surrounding the wheel body within the rim and disposed edgewise to the wheel body and rim, said annulus comprising laterally spaced plate sections, and rigid diagonal sections, each of said diagonal sections having its edge adjacent the wheel body notched intermediate the ends of the respective rigid section, a projection extending from the periphery of the wheel body into the notch of each rigid section, and means of engagement between the annulus and the rim.

3. In a wheel, a wheel body, a rim therefor, spring plate sections disposed between the rim and wheel body, rigid connectors connecting said sections and arranged circumferentially of the wheel body, and each formed with a notch adjacent the wheel body, and a projection extending from the wheel body into each notch and forming a rocking engagement for the respective rigid section with the wheel body, and means of engagement between the spring plate sections and the rim.

4. In a wheel, a wheel body, a rim therefor, guide plates extending from the rim past portions of the wheel body and engaging the same, bolts spacing and connecting the guide plates, spring plate sections disposed edgewise of and engaging the wheel body and spaced laterally between the guide plates, longitudinally between the bolts, and laterally disposed connections between the guide plates and spring sections.

5. In a wheel, a wheel body, a rim therefor, spring plate sections in engagement with the wheel body and disposed at opposite sides of the circumferential median line thereof, a diagonally disposed connector for said sections, and laterally acting frictional means of engagement between the spring plate sections and rim.

6. In a wheel, a wheel body, a rim therefor, a spring annulus comprising alternate spring plate sections and connectors engaging said sections at the end portions thereof, means of engagement between intermediate portions of the spring sections and one of the first two mentioned elements for alternately springing the spring sections laterally in opposite directions toward the circumferential median line of the annulus, and means of engagement between the annulus and the other of the first two mentioned elements.

7. A device of the class described comprising a wheel body, a rim surrounding said wheel body, spring plates between said wheel body and said rim and located in alternation upon opposite sides of the median line of said rim and said wheel body, and means coöperating with said rim and said plates to flex said spring plates toward said median line when said device is under load.

8. A device of the character described comprising a wheel body, a rim surrounding said wheel body, spring plates between said rim and said wheel body, said spring plates being located in alternation on opposite sides of the median of said rim and said wheel body, connectors coöperating with said spring plates, fulcrum means attached to said wheel body and coöperating with said connectors, and means between said spring plates and said rim member to flex said spring plates toward the median of said wheel body when the device is under load.

9. A device of the character described comprising a wheel body, a rim surrounding said wheel body, an annulus comprising alternate flexible and non-flexible sections, means for attaching said non-flexible sections to said wheel body, retaining members carried upon said flexible sections, retaining members operatively connected with said rim, and friction means coöperating with the retaining members on the flexible sections and the retaining members on said rim.

10. A device of the character described comprising a wheel body, a rim surrounding said wheel body, an annulus upon said rim, said annulus comprising alternate flexible and non-flexible sections, means for attaching said non-flexible sections to said rim, said attaching means being substantially in the median plane of said wheel body, said flexible sections being in alternation on opposite sides of said median plane, and means coöperating with said rim to flex said flexible sections toward said median plane.

11. A device of the character described comprising a wheel body, a rim surrounding said wheel body, an annulus surrounding said wheel body, said annulus including flexible members and non-flexible members, said non-flexible members being attached to the back of said flexible members, cup members attached to the front of said flexible members, and means coöperating with said rim and with said cup members to force said flexible members against said non-flexible members.

12. In a wheel, a wheel body, a rim therefor, an annulus including spring plate sections disposed edgewise with respect to the wheel body and the rim, said sections being spaced from the opposite side of the circumferential median line of the wheel, connectors between said sections, and friction means between said rim and said spring plates.

13. In a wheel, a wheel body, a rim therefor, guide plates carried by said rim, reinforcing flange plates mounted on the exterior of said guide plates, an annulus including spring plate sections and rigid sections, said rigid sections being provided with depressions in their upper edge, said annulus being disposed edgewise with respect to the wheel body and the rim, retaining bolts passing through said guide plates and said flange plates and arranged above the depressions in said rigid sections, friction means between said spring plates and said guide plates, and means for attaching said rigid sections to said wheel body.

14. In a wheel, a wheel body, a rim therefor, an annulus including spring plate sections and rigid sections intermediate said spring plate sections, said annulus being disposed edgewise with reference to said wheel, said spring plate sections being disposed on opposite sides of the circumferential median line of the wheel, said rigid sections being disposed diagonally across said median line, friction means between said rim and said plates and arranged in alternation on opposite sides of said annulus, connections between said rigid sections and said wheel body, said annulus being in contact throughout its entire inner circumference with said wheel body, the construction and arrangement of parts being such as to cause the diameter of the annulus to remain constant when the spring plates are flexed in sustaining loads upon the wheel.

In witness whereof I have hereunto set my hand in the presence of two witnesses.

LEVIN GESSFORD HANDY.

Witnesses:
 EDGAR M. KITCHIN,
 FRANK V. COOPER.

Copies of this patent may be obtained for five cents each, by addressing the "Commissioner of Patents, Washington, D. C."